June 3, 1969 — T. L. JERNIGAN — 3,447,668
CONVEYER
Filed April 12, 1967

INVENTOR
THOMAS L. JERNIGAN

BY Browne, Schuyler & Beveridge
ATTORNEYS

United States Patent Office 3,447,668
Patented June 3, 1969

3,447,668
CONVEYER
Thomas L. Jernigan, Richmond, Va., assignor to Eskimo Pie Corporation, Richmond, Va., a corporation of Delaware
Filed Apr. 12, 1967, Ser. No. 630,235
Int. Cl. B65g *15/30*
U.S. Cl. 198—195    7 Claims

ABSTRACT OF THE DISCLOSURE

This invention relates to a conveyer comprising a plurality of plates each having a forwardly projecting ledge which is pivotally supported at spaced intervals along an endless belt arranged and supported in the form of an elongated loop in a vertical plane in which the trailing edge of each plate supportingly rests on the ledge of the following plate when moving along the upper portion of the loop.

---

This invention relates to a conveyer and more particularly to a conveyor in which the article supporting surface comprises a moving line of abutting plates, which are generally flat metal plates on which bars of frozen desserts are transported.

In manufacturing frozen desserts, such as ice cream bars, the dessert bars must be transported over some distances which includes being carried through closed cabinets at subfreezing temperatures. Metal is an ideal material for the surfaces of these conveyers for frozen desserts due to its high thermal conductivity, hardness and resistance to scratching, durability and ease of cleaning and being maintained in a sterile condition. However, since conveyers are conventionally arranged in the form of a closed loop, flexible material such as rubber or plastics has usually been utilized for the conveyor surfaces due to the flexibility of this material and the relative ease with which it can be formed about the curved end surfaces of the closed conveyer loop. If the conveyer surface is to be formed of metal of a sufficiently thick gauge to be practical, the metal is too rigid to be utilized as a continuous belt in the same manner as the more flexible non-metallic materials.

Accordingly, a major object of this invention is to produce a closed loop conveyer in which the conveying surface comprises a material which is hard, can be maintained in a sterile condition and has high thermal conductivity.

Another object of this invention is to produce a conveyer suitable for transporting frozen desserts through freezing chambers.

A still further object of this invention is to produce a closed loop conveyer in which the supporting surface comprises flat plates of metal.

Other objects and features of the invention will become apparent to those skilled in the art as the disclosure is made in the following description of a preferred embodiment of the invention illustrated in the accompanying sheet of drawings in which.

Figure 1:
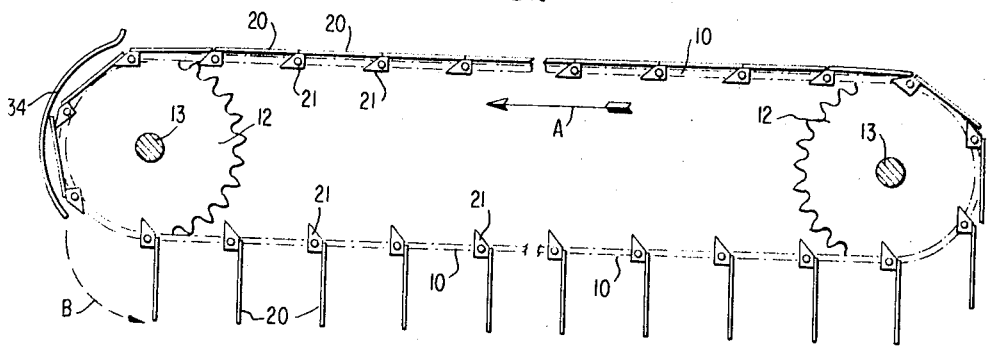
FIGURE 1 is a side elevation of the conveyer.
Figure 2:
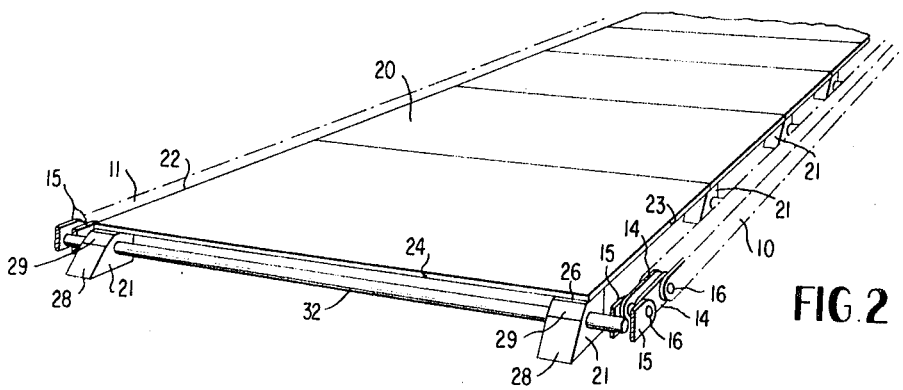
FIGURE 2 is a partial perspective view of the upper portion of the conveyer.

First referring to FIGURES 1 and 2, the conveyer surface is supported by two juxtaposed, endless link chains 10 and 11, each of which is arranged in an elongated, closed loop having a substantial horizontal upper run along which the articles on the conveyer surface are transported in the direction of the arrow A with the chains supported and passing around the sprocket wheels 12 having a central shaft 13 supported by suitable bearings. The chains 10 and 11 are driven at the same speed either by a prime mover connected through the shafts 13 or other suitable and equivalent means, not shown. The link chains 10 and 11 are of the usual structure comprising oppositely spaced links 14 which are pivotally connected at opposite ends to pairs of overlapping links 15 by pin joints 16. Although the conventional link chains 10 and 11 are utilized to form the moving, continuous loops on which the conveyer is supported, any other equivalent means of providing an endless loop would be satisfactory.

Figure 3:
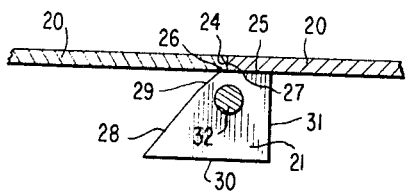
FIGURE 3 is a partial sectional view in side elevation of a portion of two adjacent plates of the conveyer with the plates in the position occupied along the top horizontal run of the conveyer.

The conveyer surface supported by the endless belts 10 and 11 comprises a plurality of flat plates 20. A forwardly projecting ledge 21 is welded or suitably affixed to the underside of each plate 20 at each of the two outside edges 22 and 23 at the leading edge 24 of the plate, the leading edge being the edge in the direction of movement of each plate as it is carried by the endless chains 10 and 11 in the direction indicated by the arrow A in FIGURE 1. The ledge 21 is indicated to be a five sided object in cross section with the top flat edge 25 extending a short distance ahead of the leading edge 24 of the plate to form a shallow shoulder 26 on which the trailing edge 27 of the next preceding plate rests when the plates are carried along the top horizontal run of the conveyer. The remaining front face of the ledge 21 is angled downwardly away from the shoulder 26 so as to form an acute angle with an extension of the top face 25 and shoulder 26 of the ledge 21, the lower segment 28 of the front face being a flat surface of which an extension is substantially tangential to the upper surface of the plate 20 at the leading edge 24 and the upper segment 29 being a flat surface extending upwardly from the lower segment 28 at a lesser acute angle to the top surface of the shoulder 26 than the lower segment. The bottom and rear edges 30 and 31 of the ledge are indicated to be normal to each other but this is not necessary nor need the ledge 21 be a separate piece affixed to the bottom of the plate 20 as it could be integral with the plate. A rod 32 extends through both ledges 21 on each side of the plate 20 with the outer ends of the rod 32 piercing and being supportingly carried by holes in the inside links 15 of each of the chains 10 and 11 so that the chains support the plate 20 via the ledges 21. The connection of the rod 32 to the links 15 and the ledge 21 is such that the ledge 21 (and plate 20) are free to pivot about the longitudinal axis of the supporting rod 32, as can be seen in the bottom portion of FIGURE 1. The rods 32, carrying the ledges 21 and plates 20, are supported from the individual links 15 at spaced intervals along the length of the chains 10 and 11 such that the lower portion of the railing edge 27 of each plate 20 rests on the shoulder 24 to substantially abut the leading edge 24 of the following plate 20 when the plates are positioned along the horizontal top run of the conveyer, as illustrated in FIGURES 1–3. A guard 34 extends around the forward periphery of the path followed by the chains 10 and 11 and the plates 20 as they proceed around the forward sprocket wheel 12 from the top horizontal run to the lower return run to prevent the plates 20 from tumbling prematurely.

Figure 4:
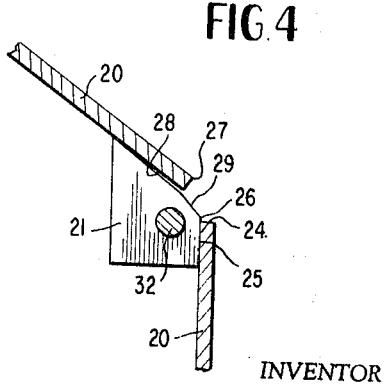
FIGURE 4 is the same view as FIGURE 3 with the plates in the position occupied when passing around the curved ends of the conveyer.
Figure 5:
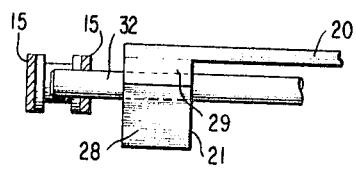
FIGURE 5 is a partial sectional view in front elevation with the plates in the same position as in FIGURE 3.

As can be seen in FIGURES 1 and 2, along the top horizontal run of the conveyer the forward portion of each successive plate 20 is supported by the rod 32 from the chains 15 and the rear portion of each plate 20 is supported by the shoulder 26 of the ledge of the next following plate to form a flat conveying surface. Although the conveyer illustrated has a top horizontal flat surface, this is not essential and the top surface of the plates 20 could be contoured to better support particular articles. As the leading edge of each plate reaches the forward sprocket wheel 12 and is carried downwardly around the curved periphery of the sprocket wheel by the chains 10 and 11, the trailing edge 27 of the plate is tilted upwardly about the axis of the rod 32 and carried forwardly from the supporting shoulder 26 of the ledge of the following plate and downwardly along the upper forward face segment 29 of the ledge and eventually onto the lower face segment 28, as illustrated in the left hand portion of FIGURE 1 and also in FIGURE 4. As the ledge 21 and plate 20 are carried further around the periphery of the sprocket wheel 12, the rear edge 27 of the plate 20 is pivoted forwardly to rest on the guard rail 34 and eventually pivots in an arc about the axis of the supporting rod 32 in the direction of the dotted arrow B to hang vertically downwardly as it is carried rearwardly along the bottom run of the conveyer. Upon reaching the rear portion of the conveyer the ledges 21 are carried upwardly around the lower segment of periphery of the rear sprocket wheel 12 and eventually the rear edge 27 of each vertically hanging plate 20 comes in contact with the protruding forward face of the ledges 21 of the following plate and is carried upwardly over the forward faces 28 and 29 of the following ledge 21 to finally rest on the shoulder 26 in abutment with the leading edge 24 of the following plate 20 as the plate progresses forwardly along the top horizontal run of the conveyer.

Thus it can be seen that the plates 20 are each supported at the forward and trailing edges as they proceed down the top horizontal run of the conveyer to form a flat surface on which objects may be conveyed. As the plates reach the forward loop of the conveyer chain belts 10 and 11 they are succesively pivoted forwardly in an arc until they fall forwardly to hang vertically supported by the rods 32 as they pass along the lower reutrn loop of the conveyer. The vertically hanging plates on the bottom run of the conveyer permits free circulation of cold air through the freely hanging plates of the bottom run and thus aid in bringing the temperature of the plates 20 to that of the circulating cold air. Further, if desired, the freely hanging plates may be sprayed with a cleaning solution or passed through scrubbing brushes and other cleansing aids. Upon reaching the end of the lower return run, the plates are then raised as they pass around the periphery of the rear conveyer loop to assume an abutting position in which the plates are in alignment, with the rear end of each plate supported by the shoulder of the ledge on the following plate.

It should be understood, of course, that the foregoing disclosure relates to only a preferred embodiment of the invention and that numerous modifications or alternations may be made therein without departing from the spirit and scope of the invention as set forth in the appended claims.

What is claimed is:
1. A frozen confection conveying device comprising
at least one endless propelling chain,
a pair of sprocket wheels horizontally spaced apart and around which said chain is supported as an elongated loop having upper and lower horizontally extending runs between said wheels,
means for propelling said chain in one direction around said loop,
a plurality of conveyer plates having a flat upper surface on which the confections are supportingly conveyed,
the leading edge of each said plate in the direction of movement along said upper run having a protruding ledge extending forwardly and below said plate upper surface,
means for pivotally supporting said plates at such spaced intervals along said chain that the leading and trailing edges of the upper surfaces of adjacent plates are in an abutting relationship along said upper run and form a flat, substantially continuous planar surface,
said pivotal support means pivotally supporting said plates for unrestricted pivotal motion about a fixed axis transversely of said plate below said supporting surface adjacent the leading edge of the plate,
each said ledge having a shallow shoulder extending forwardly of and below the level of the leading edge of said plate upper surface and adapted to support the lower surface of the trailing edge of an adjacent plate,
said ledge having a forward face extending downwardly and forwardly of said shoulder a substantial distance from said shoulder and on which forward face the trailing edge of the adjacent plate is movably supported while passing between said upper and lower runs,
and a retaining rail spaced forwardly of the leading sprocket wheel in the direction of movement along said upper run a distance to loosely retain said plates from pivoting to a vertically hanging position and extending partially around the forward periphery of said wheel to terminate prior to the lower run and release the trailing edge of said plates for pivotal movement of the plates to a vertical position hanging freely suspended as they reach and pass along said lower run.

2. The conveyer of claim 1 wherein each said shoulder has a width no greater than the thickness of the trailing edge of the adjacent plate supported by said shoulder along said upper run.

3. The conveyer of claim 1 wherein each said ledge forward face has at least two segments, the lower and forwardmost segment having a flat face lying in a plane passing forwardly of the leading edge of said plate and the other segments establishing a lesser acute angle with said shoulder than said lower face.

4. The conveyer of claim 1 wherein each said plate has two ledges, each of which is adjacent an outer edge of said plate and each ledge is pivotally supported by a separate one of a pair of said chains each arranged in a loop parallel to and outside the outer edges of said plates.

5. The conveyer of claim 1 wherein each said plate includes two ledges, each of which is adjacent an outer edge of said plate, and said pivotal support means includes a rod extending perpendicularly through a link of said chain and through each of the two ledges of each plate below said shoulder for supporting each said plate for free pivotal movement about the axis of said rod.

6. The conveyer of claim 5 wherein a single rod supports each said plate, said plates being pivotally supported by a pair of said link chains each supported to lie outside the opposite outer edges of said plates with the outer ends of said rod extending through a corresponding link of each of the pair of chains.

7. The conveyer of claim 5 wherein said ledge forwardly angled surface has two segments, the face of the lower and forwardmost surface having a flat face lying in a plane substantially tangent to the forward top surface of said plate and the face of the upper segment establishing a lesser acute angle with said shoulder than said lower face.

References Cited

UNITED STATES PATENTS

| | | | |
|---|---|---|---|
| 936,162 | 10/1909 | Pringle | 198—195 X |
| 2,356,144 | 8/1944 | Beers | 198—195 X |
| 2,666,404 | 1/1954 | Kessler | 198—195 X |

EDWARD A. SROKA, *Primary Examiner.*